(12) United States Patent
Tang et al.

(10) Patent No.: US 10,475,102 B2
(45) Date of Patent: Nov. 12, 2019

(54) PROVIDING PERSONALIZED ITEM RECOMMENDATIONS USING SCALABLE MATRIX FACTORIZATION WITH RANDOMNESS

(71) Applicant: WAL-MART STORES, INC., Bentonville, AR (US)

(72) Inventors: Lei Tang, Milpitas, CA (US); Patrick Harrington, San Francisco, CA (US); Tao Zhu, Millbrae, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 265 days.

(21) Appl. No.: 15/425,705

(22) Filed: Feb. 6, 2017

(65) Prior Publication Data
US 2017/0148085 A1  May 25, 2017

Related U.S. Application Data

(63) Continuation of application No. 13/970,271, filed on Aug. 19, 2013, now abandoned.

(51) Int. Cl.
*G06Q 30/06* (2012.01)

(52) U.S. Cl.
CPC .................. *G06Q 30/0631* (2013.01)

(58) Field of Classification Search
None
See application file for complete search history.

(56) References Cited

U.S. PATENT DOCUMENTS

| | | | |
|---|---|---|---|
| 7,113,917 B2 | 9/2006 | Jacobi et al. | |
| 7,328,216 B2 | 2/2008 | Hofmann et al. | |
| 7,475,027 B2* | 1/2009 | Brand | G06Q 30/02 705/26.7 |
| 7,685,232 B2* | 3/2010 | Gibbs | G06Q 30/02 709/203 |
| 7,953,676 B2 | 5/2011 | Agarwal et al. | |
| 8,001,132 B2 | 8/2011 | Koren et al. | |
| 8,032,526 B2 | 10/2011 | Fukazawa et al. | |
| 8,086,555 B2 | 12/2011 | Pan et al. | |
| 8,103,675 B2 | 1/2012 | Zhou et al. | |

(Continued)

OTHER PUBLICATIONS

Scaling Matrix Factorization for Recommendation with Randomness; Lei Tang, Patrick Harrington; WWW 2013 Companion, pp. 39-40, May 13-17, 2013, Rio de Janeiro, Brazil. May 13, 2013.

(Continued)

*Primary Examiner* — Michael Tomaszewski
(74) *Attorney, Agent, or Firm* — Bryan Cave Leighton Paisner LLP

(57) ABSTRACT

Providing personalized item recommendations using scalable matrix factorization with randomness. Various embodiments involve ecommerce websites, an item interaction matrix, item interaction weightings, factorizing into a user feature matrix and an item feature matrix, computing a thin matrix, generating a random Gaussian matrix, decomposing a matrix Y by a QR factorization, performing a singular value decomposition, performing alternative least squares, computing item interaction scores, selecting at least one item for recommendation to an Internet user based on the item interaction scores, or a combination thereof.

20 Claims, 10 Drawing Sheets

(56) References Cited

U.S. PATENT DOCUMENTS

| | | |
|---|---|---|
| 8,131,732 B2 | 3/2012 | Yu et al. |
| 8,229,798 B2 | 7/2012 | Koren et al. |
| 2009/0307296 A1* | 12/2009 | Gibbs .................... G06Q 30/02 709/201 |
| 2010/0268661 A1 | 10/2010 | Levy et al. |
| 2011/0258196 A1 | 10/2011 | Lepsoy et al. |
| 2012/0030020 A1 | 2/2012 | Bucak et al. |
| 2012/0030159 A1 | 2/2012 | Pilaszy et al. |
| 2012/0253884 A1 | 10/2012 | Koren et al. |

OTHER PUBLICATIONS

Matrix Factorization Techniques for Recommender Systems; Yehuda Koren, Robert Bell and Chris Volinsky; IEEE Computer Society, vol. 42, No. 8, pp. 30-37, Aug. 2009. Aug. 2009.

Large-scale Parallel Collaborative Filtering for the Nettlix Prize; Yunhong Zhou, Dennis Wilkinson, Robert Schreiber and Rong Pan; AAIM, pp. 337-348, 2008. 2008.

Finding Structure with Randomness: Probabilistic Algorithms for Constructing Approximate Matrix Decompositions; N. Halko, P.G. Martinsson, J.A. Tropp; SIAM Review, vol. 53, No. 2, pp. 217-288; May 2011. May 2011.

Google News Personalization: Scalable Online Collaborative Filtering; Abhinandan Das, Mayur Datar, Ashutosh Garg, Shyam Rajaram; WWW, pp. 271-280, 2007. 2007.

Scalable Collaborative Filtering Approaches for Large Recommender Systems; Gabor Takacs, Istvan Pilaszy, Bottyan Nemeth, Domonkos Tikk; Journal of Machine Learning Research, vol. 10, pp. 623-656, Jun. 2009. Jun 2009.

* cited by examiner

PROVIDING PERSONALIZED ITEM RECOMMENDATIONS USING SCALABLE MATRIX FACTORIZATION WITH RANDOMNESS

RELATED PATENT APPLICATIONS

This patent application claims priority to, and is a continuation of, U.S. non-provisional patent application Ser. No. 13/970,271, filed Aug. 19, 2013, PROVIDING PERSONALIZED ITEM RECOMMENDATIONS USING SCALABLE MATRIX FACTORIZATION WITH RANDOMNESS which has the same inventors as the current patent application and the same assignee, and the contents of all of which are incorporated herein by reference.

TECHNICAL FIELD

This disclosure relates generally to automated personalized recommendation systems, and relates more particularly to collaborative filtering recommendation systems using matrix factorization.

BACKGROUND

Modern consumers have a plethora of choices when selecting products to purchase. Recommendation systems have been developed to provide personalized item recommendations. Many of these systems utilize a collaborative filtering approach, in which the systems analyze aggregated data of a large number of users' past behavior with respect to products to suggest or predict future behavior of specific users with respect to those products. Some collaborative filtering approaches rely on a latent factor model in which latent factors are inferred from patterns of past behavior. Latent factor models that use matrix factorization gained momentum during the Netflix Prize competition. Existing methods of matrix factorization in collaborative filtering recommendation systems, however, have exhibited scaling problems. Specifically, for huge data sets (e.g., for tens of millions of users and a million products), existing matrix factorization techniques require extensive processing resources and can take a long time. Furthermore, recommendation systems that rely merely on a set of user ratings for items do not take into account a wealth of additional information regarding other types of item interactions made by users on eCommerce websites.

BRIEF DESCRIPTION OF THE DRAWINGS

To facilitate further description of the embodiments, the following drawings are provided in which.

Figure 1:
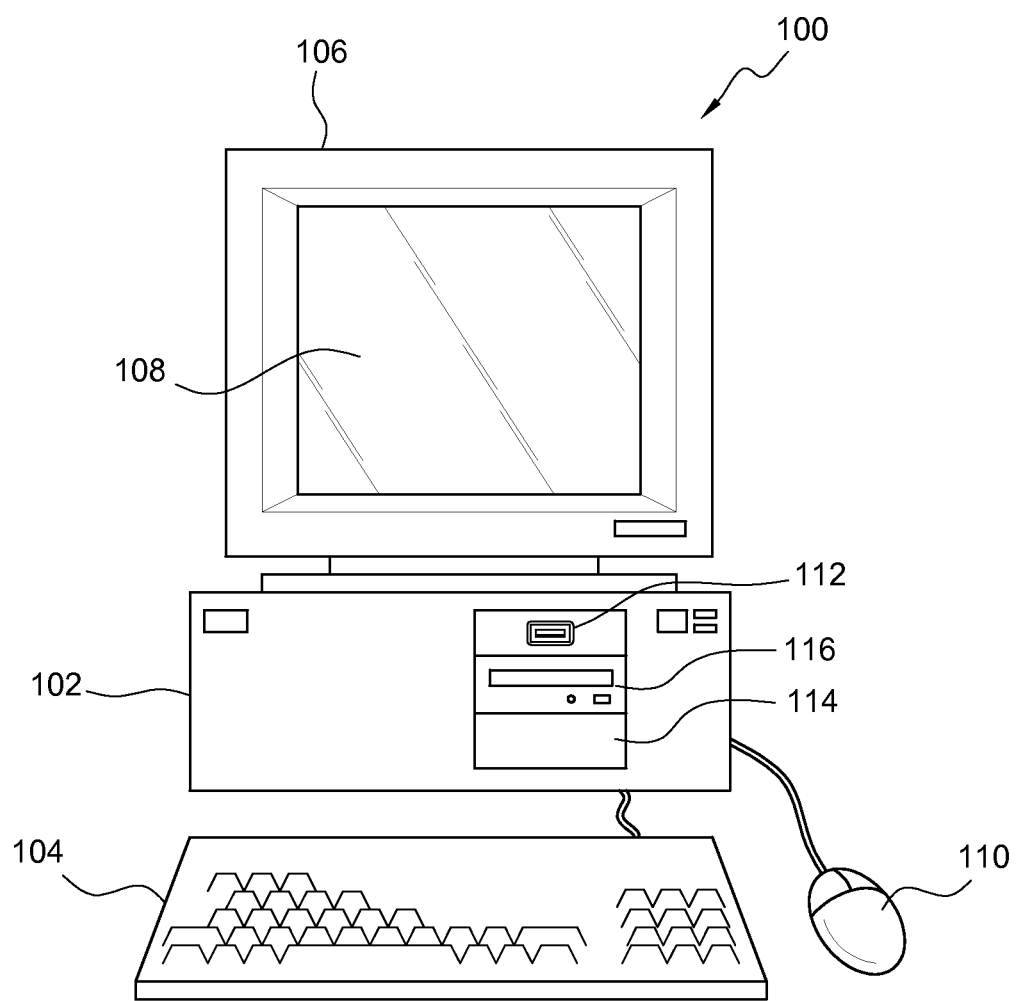
FIG. 1 illustrates a front elevational view of a computer system that is suitable for implementing an embodiment of the recommendation system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more mechanical elements may be mechanically coupled together, but not be electrically or otherwise coupled together. Coupling may be for any length of time, e.g., permanent or semi-permanent or only for an instant. "Mechanical coupling" and the like should be broadly understood and include mechanical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a method of providing personalized item recommendations to at least one user of a plurality of users based on item interactions by the plurality of users. The method can be implemented via execution of computer instructions configured to run at one or more processing modules and configured to be stored at one or more non-transitory memory storage modules. The method can include receiving an item interaction matrix, denoted by A. The item interaction matrix A can have a plurality of rows corresponding to the plurality of users. A number of rows of the item interaction matrix A can equal a number of the plurality of users. The item interaction matrix A can have a plurality of columns corresponding to item interaction weightings for a plurality of items. A number of columns of the item interaction matrix A can equal a number of potential item interaction weightings. The method can include factorizing the item interaction matrix A into a user feature matrix, denoted by P, and an item feature matrix, denoted by Q. The factorizing can include generating the item feature matrix Q, which can include computing a thin matrix, denoted by B. The thin matrix B can be an estimated projection of the item interaction matrix A. A number of rows of the thin matrix B is can be equal to a selected number of latent factors. The number of rows of the thin matrix B can be less than the number of the plurality of users. The method can include performing a singular value decomposition on the thin matrix B, computing the item feature matrix Q, computing the user feature matrix P by performing alternative least squares using the item feature matrix Q, computing item interaction scores using the user feature matrix P and the item feature matrix Q, and selecting at least one item of the plurality of items for recommendation to at least one user from the plurality of users based on the item interaction scores.

Further embodiments can include a system for providing personalized item recommendations to at least one user of a plurality of users based on item interactions by the plurality of users. The system can include one or more processing modules and one or more non-transitory memory storage modules storing computing instructions configured to run on the one or more processing modules. The computing instructions can perform the act of receiving an item interaction matrix, denoted by A. The item interaction matrix A can have a plurality of rows corresponding to the plurality of users. A number of rows of the item interaction matrix A can equal a number of the plurality of users. The item interaction matrix A can have a plurality of columns corresponding to item interaction weightings for a plurality of items. A number of columns of the item interaction matrix A can equal a number of potential item interaction weightings. The computing instructions can perform the act of factorizing the item interaction matrix A into a user feature matrix, denoted by P, and an item feature matrix, denoted by Q. The factorizing can include generating the item feature matrix Q, which can include computing a thin matrix, denoted by B. The thin matrix B can be an estimated projection of the item interaction matrix A. A number of rows of the thin matrix B is can be equal to a selected number of latent factors. The number of rows of the thin matrix B can be less than the number of the plurality of users. The computing instructions can perform the acts of performing a singular value decomposition on the thin matrix B, computing the item feature matrix Q, computing the user feature matrix P by performing alternative least squares using the item feature matrix Q, computing item interaction scores using the user feature matrix P and the item feature matrix Q, and selecting at least one item of the plurality of items for recommendation to at least one user from the plurality of users based on the item interaction scores.

Figure 2:
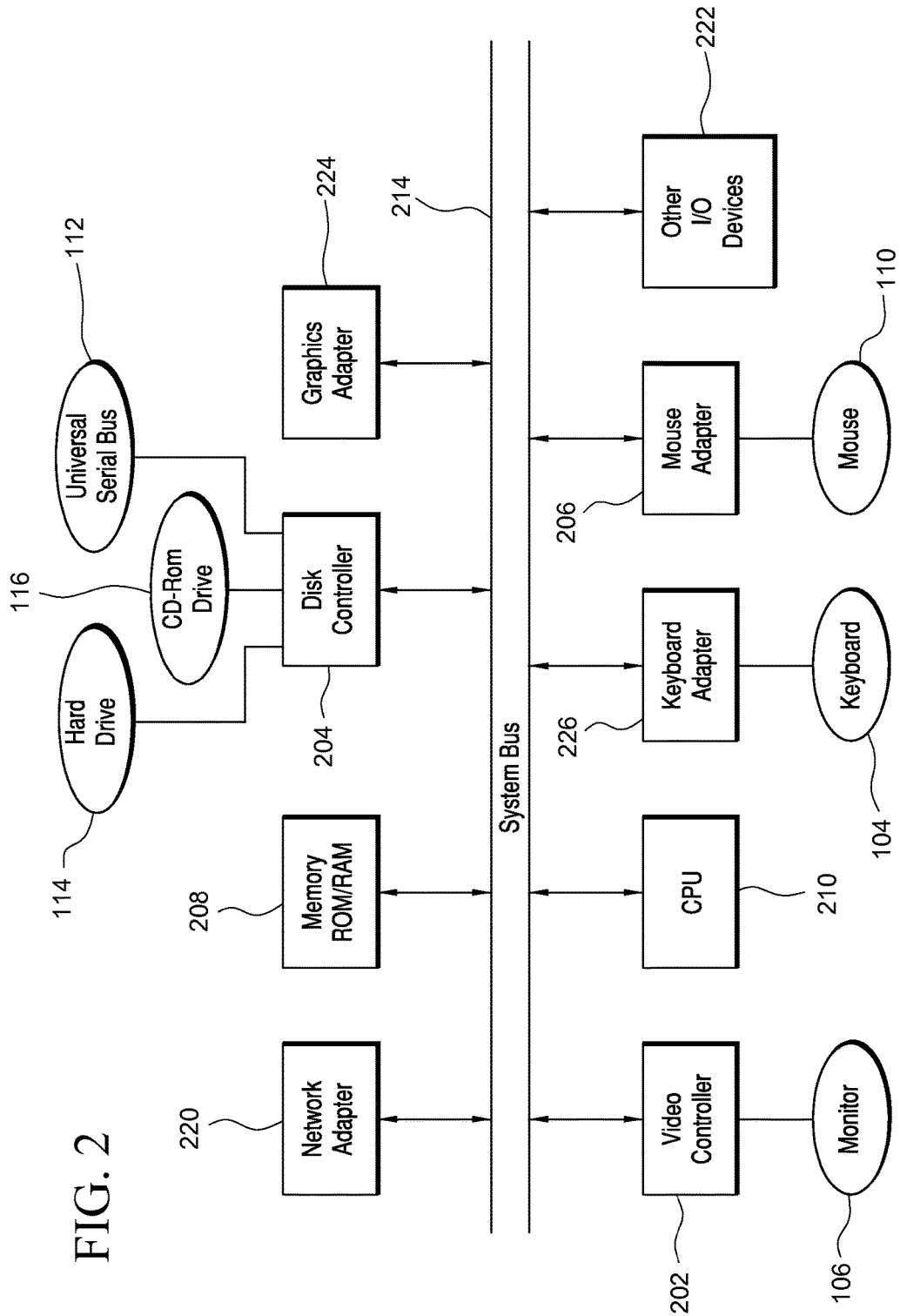
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described below. As an example, a different or separate one of a chassis 102 (and its internal components) can be suitable for implementing the techniques described below. Furthermore, one or more elements of computer system 100 (e.g., a refreshing monitor 106, a keyboard 104, and/or a mouse 110, etc.) can also be appropriate for implementing the techniques described below. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described below.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
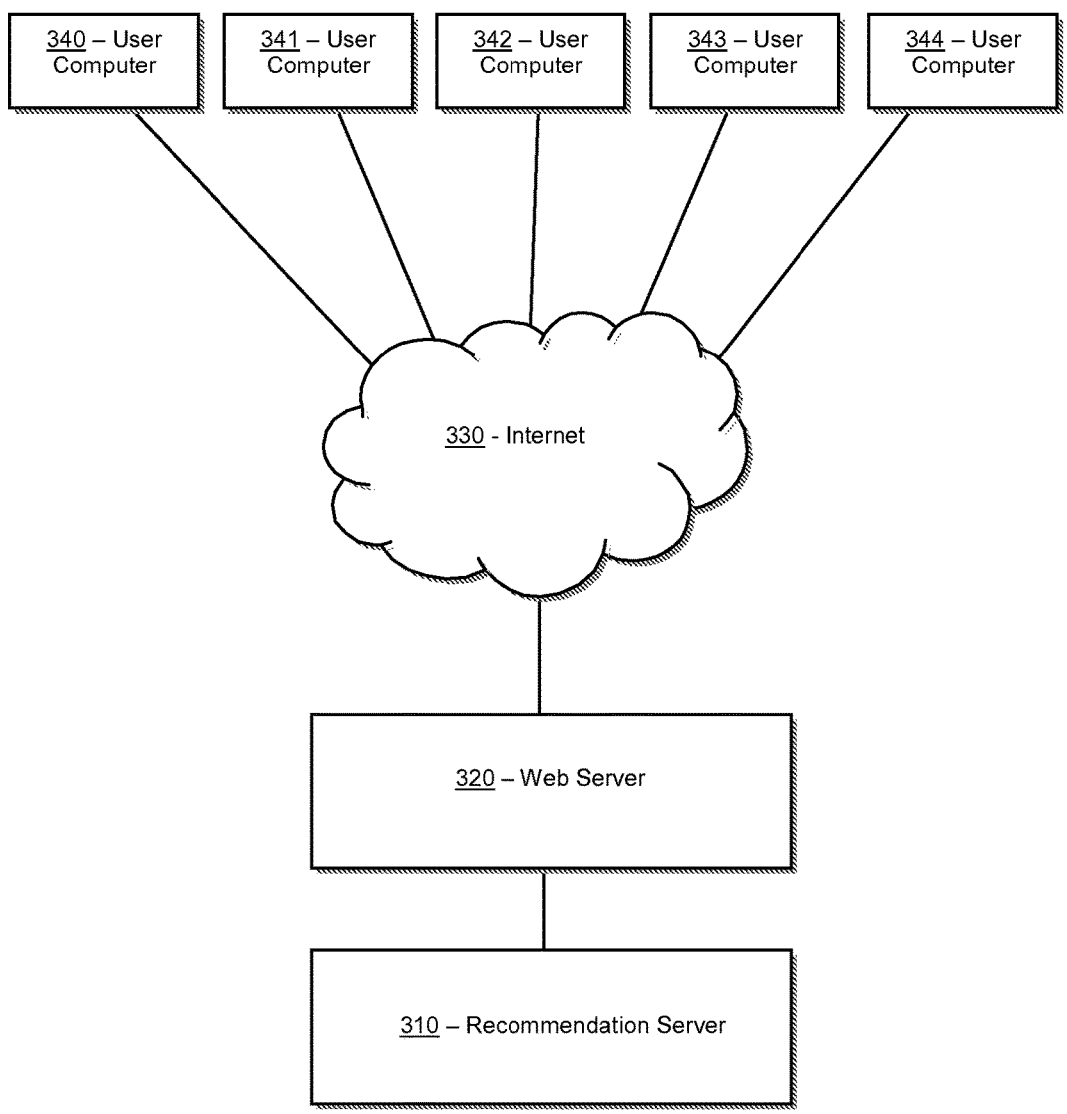
FIG. 3 illustrates a block diagram of an example of a system for providing personalized item recommendations, according to an embodiment.

Turning ahead in the drawings, FIG. 3 illustrates a block diagram of a system 300 that can be employed for providing personalized item recommendations, according to an embodiment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300. In some embodiments, system 300 can include a recommendation server 310 and/or a web server 320. System 300 can include a plurality of user computers (e.g., 340, 341, 342, 343, 344). Web server 320, recommendation server 310, and/or user computers 340-344 can be each be a computer system, such as computer system 100 (FIG. 1), and as explained above, can each be a single computer, a single server, or a cluster or collection of computers or servers, or a cloud of computers or servers. In certain embodiments, user computers 340-344 can be desktop computers, laptop computers, smart phones, tablet devices, and/or other endpoint devices.

User computers 340-344 can be in data communication with web server 320 and/or recommendation server 310 through the Internet 330, and which can allow a plurality of users to interact with one or more websites provided through web server 320 and/or recommendation server 310. For example, web server 320 can host an eCommerce web site that allows users to browse and/or search for items, to add items to an electronic shopping cart, and/or to purchase items, in addition to other suitable activities. In a number of embodiments, web server 320 and/or recommendation server 310 can track the behaviors of the plurality of users with respect to these and/or other interactions. In some embodiments, web server 320 and/or recommendation server 310 can store each raw event of a user's behavior. Each raw event can be represented as a quadruple $<u_i, a_d, p_j, t>$, where $u_i$ represents user i, $a_d$ represents action d, $p_j$ represents product j, and t represents the time of the event. Each value of action d can correspond to a tracked behavior. For example, in many embodiments, d=1 can represent an item purchase action in which the user purchase the item; d=2 can represent an item browse action, in which the user clicked on the item and viewed it; d=3 can represent an item search action, in which the user searched for the item; and d=4 can represent an item cart action, in which the user added the item to the electronic shopping cart. Other interaction types are possible, such as item ratings, item returns, etc.

For a collaborative filtering analysis, user behaviors corresponding to each action can be stored in a separate matrix. For example, an item purchase type matrix $A^{(1)}$ can represent user behaviors related to item purchases, an item browse type matrix $A^{(2)}$ can represent user behaviors related to browses or online views of items, an item search type matrix $A^{(3)}$ can represent user behaviors related to search for items, and an item cart type matrix $A^{(4)}$ can represent user behaviors related to adding items to the electronic shopping cart. In some embodiments, each item interaction type matrix $A^{(d)}$ can have a plurality of rows corresponding to the plurality of users. The number of rows can be equal to the number of the plurality of users. In a number of embodiments, each matrix $A^{(d)}$ can have a plurality of columns corresponding to item interaction weightings. The number of columns can be equal to the number of the items, which is the number of potential item interaction weightings for that type of item interaction. In other words, each element $A_{i,j}^{(d)}$ can represent an interaction weightings for action d taken by user i with respect to item j. For example, if user i=8 decides to purchase item j=3, element $A_{8,3}^{(1)}$ can store the item interaction weighting. In some embodiments, the item interaction weighting for certain behaviors can be represented by a predetermined value. For example, in some embodiments, a completed purchase can be represented by an item interaction score of 10, and a non-purchase can be represented by an item interaction weighting of 0. In other embodiments, the item interaction weightings can be a Boolean 1 or 0 to represent whether the item was purchase or not.

Alternatively, or in addition to, in some embodiments, item interactions weightings can be adjusted based on one or more factors, such as the time since purchase, the popularity of the item, or other suitable weighting factors. Item interaction weightings can advantageously be adjusted to more closely represent users' interactions with items. For example, item interaction weightings can reflect that a user purchased an item within the past few weeks, rather than a year ago. In some embodiments, item interaction weightings are adjusted by a time decay adjustment, such that item interactions that occurred more recently are given more weight than item interactions that occurred less recently. For example, an item interaction weighting can be adjusted by an exponential decay function, such as $$\exp\left\{-\frac{t_0 - t}{\beta}\right\},$$

where $t_0$ is the current time and $\beta$ is a decay parameter. In some embodiments, decay parameter $\beta$ is 60 days. Decay parameter $\beta$ can range from 30 days to 365 days.

In a number of embodiments, item interactions with unpopular items can be given additional weight. For example, certain items are purchased by many people, so a user's purchase of that popular item does not necessarily show the user's interest in the popular item as much as a user's purchase of an unpopular item shows the user's interest in the unpopular item. In some embodiments, an item popularity adjustment can be based on the number of users who have interacted with the product. For example, the item interaction weighting can be adjusted by $$\log\left(\frac{N}{N_j}\right),$$

where N is the total number of users, and $N_j$ is the number of users who have interacted with the product j using action d. In certain embodiments, a popularity parameter can be used to fine-tune the popularity adjustment. In some embodiments, the item interaction weighting can be based on the item interaction, the time decay adjustment, and the item popularity adjustment, such that if there is an item interaction, then $$A_{i,j}^{(k)} = \exp\left\{-\frac{t_0 - t}{\beta}\right\}\log\left(\frac{N}{N_j}\right);$$

otherwise, $A_{i,j}^{(k)}=0$. In some embodiments, each item interaction weighting can be a floating point number having a range from 0 to 15. In some embodiments, the time decay adjustment and item popularity adjustment can be applied to the item interaction weightings in each matrix for each action d. In a number of embodiments, the decay parameter and/or popularity parameter can be the same and/or different for each matrix.

In a number of embodiments, one or more of the item interaction type matrices can be concatenated into an item interaction matrix A. In some embodiments, item interaction matrix A can include two or more item interaction type matrices. For example, in certain embodiments, $A=[A^{(1)}, A^{(2)}, A^{(3)}, A^{(4)}]$, such that each item interaction type matrix is concatenated to generate the item interaction matrix A. The number of rows for item interaction matrix A can be number of users, and the number of columns can be the total number of potential item interaction weightings for all of the include item interaction types. In some embodiments, recommendation server 310 can receive item interaction matrix A and can perform various procedures, processes, and/or activities, as described below, to provide personalized item recommendations. These individualized recommendations can be used, for example, for targeted email marketing, for targeted recommendations on the eCommerce websites, or for targeting advertisements on partner websites.

Figure 4:
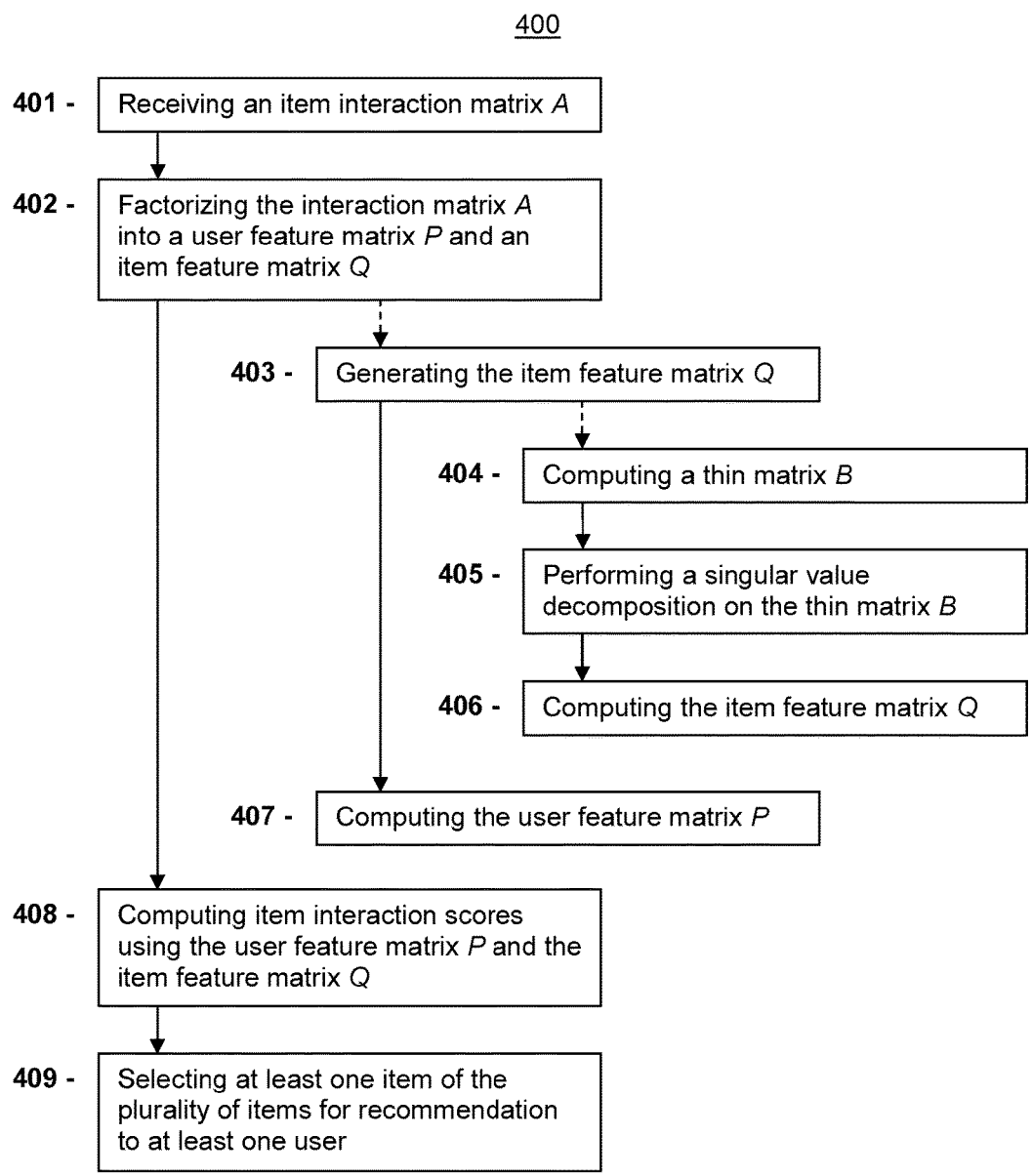
FIG. 4 illustrates a flow chart for an exemplary procedure of providing personalized item recommendations, according to another embodiment.

Turning ahead in the drawings, FIG. 4 illustrates a flow chart for a method 400 of providing personalized item recommendations to at least one user of a plurality of users based on item interactions by the plurality of users, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

Referring to FIG. 4, in some embodiments, method 400 can include block 401 of receiving item interaction matrix A. As described above, item interaction matrix A can have a plurality of rows corresponding to the plurality of users. The number of rows of the item interaction matrix A can equal the number of the plurality of users, represented by n. The item interaction matrix A can have a plurality of columns corresponding to item interaction weightings for a plurality of items. The number of columns of the item interaction matrix A can equal the number of potential item interaction weightings, represented by m. In a number of embodiments, item interaction matrix A can be received by recommendation server 310 (FIG. 3) as a data stream, as a reference to a database in memory, a reference to a database in data storage, or by another suitable mechanism.

Next, in a number of embodiments, method 400 can also include block 402 of factorizing item interaction matrix A into a user feature matrix P and an item feature matrix Q. User feature matrix P and item feature matrix Q can represent a decomposition of item interaction matrix A into two latent spaces. For a number of latent factors k, user feature matrix P can have n rows and k columns, and can represent inferred latent factors for the users. Item feature matrix Q can have m rows and k columns, and can represent inferred latent factors for the items.

In many embodiments, block 402 of factorizing item interaction matrix A into user feature matrix P and item feature matrix Q can include block 403 of generating item feature matrix Q. In a number of embodiments, block 403 of generating item feature matrix Q can include block 404 of computing a thin matrix B. Thin matrix B can be an estimated projection of the item interaction matrix A. Thin matrix B can be a low-rank matrix approximation of item interaction matrix A, as explained in a different context in N. Halko, P. G. Martinsson, and J. A. Tropp, *Finding structure with randomness: Probabilistic algorithms for constructing approximate matrix decompositions*, SIAM Rev., 53(2):217-288 (May 2011). In some embodiments, thin matrix B can have a number of rows equal to the number of latent factors k, which can be less than the number of users n. Thin matrix B can be computed in various ways, as described further below.

In some embodiments, the number of rows of thin matrix B can be not more than 1,000. In other embodiments, the number of rows of thin matrix B can be not more than 500. In yet other embodiments, the number of rows of thin matrix B can be not more than 0.01% of the number of users. In yet other embodiments, the number of rows of thin matrix B can be not more than 0.005% of the number of users. In many embodiments, the number of users is greater than or equal to 500,000. In yet other embodiments, the number of users is greater than 1 million. In further embodiments, the number of users is greater than 10 million. In yet further embodiments, the number of users is greater than 50 million. In some embodiments, the number of potential item interaction weightings is greater than or equal to 100,000. In other embodiments, the number of potential item interaction weightings is greater than or equal to 500,000. In yet other embodiments, the number of potential item interaction weightings is greater than or equal to 1 million. In further embodiments, the number of potential item interaction weightings is greater than or equal to 5 million. In yet further embodiments, the number of potential item interaction weightings is greater than or equal to 10 million.

In a number of embodiments, block 403 of generating item feature matrix Q also can include block 405 of performing a singular value decomposition on thin matrix B. Singular value decomposition is a well-established technique for identifying latent factors in a matrix, and in some embodiments can be performed by conventional techniques. In accordance with the present disclosure, the singular value decomposition is performed on thin matrix B rather than item interaction matrix A, which can advantageously allow the singular value decomposition to be performed with far less computing resources and in much less time, as thin matrix B is substantially smaller than item interaction matrix A.

In a number of embodiments, block 403 of generating item feature matrix Q further can include block 406 of computing the item feature matrix Q. In some embodiments, item feature matrix Q can be computed based on the results of the singular value decomposition of thin matrix B, as described further below.

In many embodiments, block 402 of factorizing item interaction matrix A into user feature matrix P and item feature matrix Q can include block 407 of computing user feature matrix P by performing alternative least squares (ALS) using item feature matrix Q. ALS can be performed by convention techniques. By computing an accurate item feature matrix Q in block 406, user feature matrix P can be computed using just one ALS iteration.

After block 402, in some embodiments, method 400 also can include block 408 of computing item interaction scores using user feature matrix P and item feature matrix Q. Once user feature matrix P and item feature matrix Q have been determined, recommendation server 310 (FIG. 3) can compute item interaction scores. To compute an item interaction score for a particular user and a particular item, recommendation server 310 (FIG. 3) can compute the dot product of a vector of matrix P corresponding to the user and a vector of matrix Q corresponding to the product. In certain embodiments, recommendation server 310 (FIG. 3) can compute many item interaction scores, as described further below. In a number of embodiments, item interaction scores are computed for items the user has not previously interacted with using a particular interaction type. For example, if a user has not purchased a particular item, the item interaction score for the purchase interaction type can be computed for that item.

Then, in various embodiments, method 400 additionally can include block 409 of selecting at least one item of the plurality of items for recommendation to at least one user from the plurality of users based on the item interaction scores. For example, recommendation server 310 (FIG. 3) can determine for a particular user which item or group of items have the highest item interaction scores, and can select those items for recommendation. In some embodiments, the item interaction scores for different interaction types for the same item can be used together to determine a composite score for the item, such as, for example, an average of the item interaction scores for the different interaction types of a particular item for a certain user. As described above, these individualized recommendations can be used for targeted email marketing, for targeted recommendations on the eCommerce websites, for targeting advertisements on partner websites, personalized mail recommendations, and/or for other suitable targeted marketing techniques.

Figure 5:
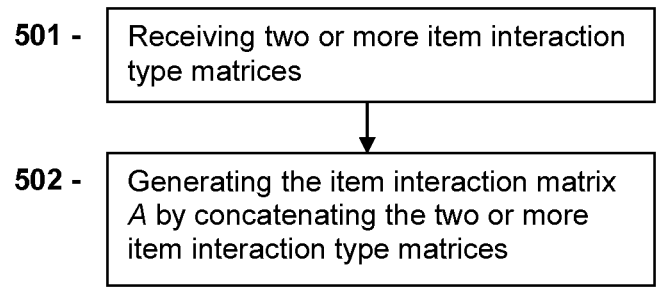
FIG. 5 illustrates a flow chart for an exemplary procedure of receiving item interaction matrix A, according to the embodiment of FIG. 4.

Turning ahead in the drawings, FIG. 5 illustrates a flow chart for block 401 of receiving item interaction matrix A, according to an embodiment. Block 401 is merely exemplary and is not limited to the embodiments presented herein. Block 401 can be employed in many different embodiments or examples not specifically depicted or described herein. In some embodiments, the procedures, the processes, and/or the activities of block 401 can be performed in the order presented. In other embodiments, the procedures, the processes, and/or the activities of block 401 can be performed in any suitable order. In still other embodiments, one or more of the procedures, the processes, and/or the activities of block 401 can be combined or skipped.

Referring to FIG. 5, in some embodiments, block 401 can include block 501 of receiving two or more item interaction type matrices each having rows and columns. As described above, the rows of each of the two or more item interaction type matrices can correspond to a plurality of users. The columns of each of the two or more item interaction type matrices can correspond to item interaction weightings for a type of item interaction for a plurality of items. For example, in a number of embodiments, recommendation server 310 (FIG. 3) can receive an item purchase type matrix and an item cart type matrix. In other embodiments, recommendation server 310 (FIG. 3) can receive an item browse type matrix and an item search type matrix. In yet other embodiments, recommendation server 310 (FIG. 3) can receive an item purchase type matrix, and item browse type matrix, an item search type matrix, and an item cart type matrix.

Next, in various embodiments, block 401 also can include block 502 of generating the item interaction matrix A by concatenating the two or more item interaction type matrices. Unlike standard collaborative filtering algorithms analyzing one type of interaction data, such as movie ratings, recommendation server 310 (FIG. 3) can advantageously analyze multiple interaction types when providing personalized item recommendations.

Figure 6:
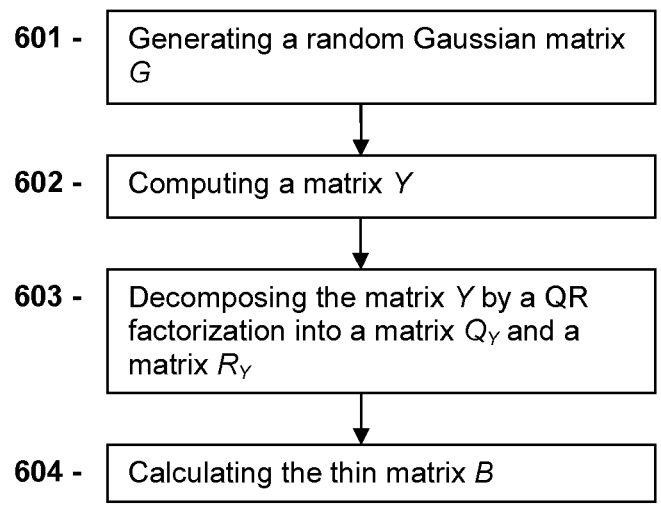
FIG. 6 illustrates a flow chart for an exemplary procedure of computing thin matrix B, according to the embodiment of FIG. 4.

Turning ahead in the drawings, FIG. 6 illustrates a flow chart for block 404 of computing thin matrix B, according to an embodiment. Block 404 is merely exemplary and is not limited to the embodiments presented herein. Block 404 can be employed in many different embodiments or examples not specifically depicted or described herein. In some embodiments, the procedures, the processes, and/or the activities of block 404 can be performed in the order presented. In other embodiments, the procedures, the processes, and/or the activities of block 404 can be performed in any suitable order. In still other embodiments, one or more of the procedures, the processes, and/or the activities of block 404 can be combined or skipped.

Referring to FIG. 6, in some embodiments, block 404 can include block 601 of generating a random Gaussian matrix G. In some embodiments, random Gaussian matrix G can have a number of rows equal to the number of potential item interaction weightings m and a number of columns equal to the selected number of latent factors k. recommendation server 310 (FIG. 3) can generate random Gaussian matrix G using conventional Gaussian distribution techniques for random number generation.

Next, in a number of embodiments, block 404 also can include block 602 of computing a matrix Y. Matrix Y can be a matrix product of the item interaction matrix A and the random Gaussian matrix G, and can be computed by recommendation server 310 (FIG. 3). Matrix Y can have a number of rows equal to the number of the plurality of users n, and a number of columns equal to the selected number of latent factors k. In a number of embodiments, computing matrix Y can be devoid of using a power iteration, which can advantageously reduce the time required to compute matrix Y.

Afterwards, in certain embodiments, block 404 further can include block 603 of decomposing matrix Y by a QR factorization into a matrix $Q_Y$ and a matrix $R_Y$. In some embodiments, matrix Y can be the matrix product of the matrix $Q_Y$ and the matrix $R_Y$. Matrix $Q_Y$ can be an orthonormal matrix having a number of rows equal to the number of the plurality of users n. Matrix $Q_Y$ can have a number of columns equal to the selected number of latent factors k. In certain embodiments, matrix $R_Y$ can be a matrix having a number of rows and a number of columns each equal to the selected number of latent factors k. Recommendation server 310 (FIG. 3) can decompose matrix Y using conventional QR factorization techniques.

Then, in various embodiments, block 404 additionally can include block 604 of calculating thin matrix B. In a number of embodiments, thin matrix B can be the matrix product of a transpose of the matrix $Q_Y$ and of the item interaction matrix A. The number of columns of the thin matrix B can be equal to the number of potential item interaction weightings k. Recommendation server 310 (FIG. 3) can perform the transpose and matrix product operation using conventional techniques. In other embodiments, block 404 or computing thin matrix B can be performed by another suitable method such that thin matrix B is a smaller-sized estimated projection of item interaction matrix A.

Figure 7:
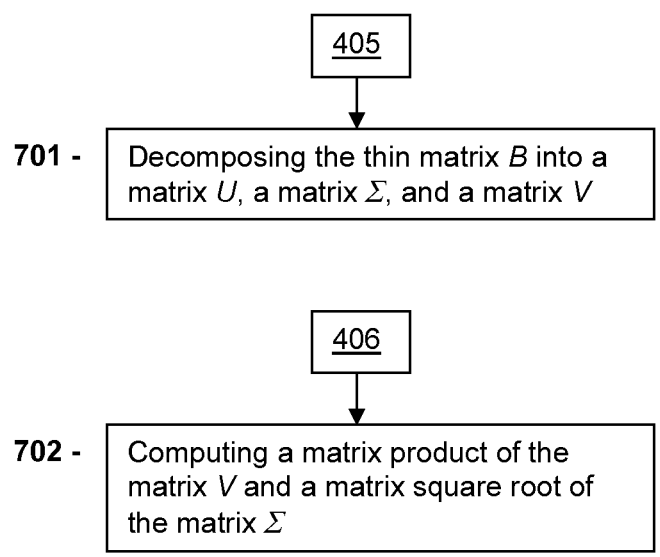
FIG. 7 illustrates a flow chart for an exemplary procedure of performing a singular value decomposition on thin matrix B and computing item feature matrix Q, according to the embodiment of FIG. 4.

Turning ahead in the drawings, FIG. 7 illustrates a flow chart for block 405 of performing singular value decomposition on thin matrix B and block 406 of computing the item feature matrix Q, according to an embodiment. Blocks 405 and 406 are merely exemplary and is not limited to the embodiments presented herein. Blocks 405 and 406 can be employed in many different embodiments or examples not specifically depicted or described herein. In some embodiments, the procedures, the processes, and/or the activities of blocks 405 and/or 406 can be performed in the order presented. In other embodiments, the procedures, the processes, and/or the activities of blocks 405 and/or 406 can be performed in any suitable order. In still other embodiments, one or more of the procedures, the processes, and/or the activities of blocks 405 and/or 406 can be combined or skipped.

Referring to FIG. 7, in some embodiments, block 405 of performing singular value decomposition on thin matrix B can include block 701 of decomposing thin matrix B into a matrix U, a matrix Σ, and a matrix V. In various embodiments, thin matrix B can be a matrix product of matrix U, matrix Σ, and a transpose of matrix V. Matrix U can be an orthonormal matrix having a number of rows and a number of columns each equal to the selected number of latent factors k. In some embodiments, matrix Σ can be a diagonal matrix having a number of rows and a number of columns each equal to the selected number of latent factors k. In several embodiments, matrix V can be an orthonormal matrix having a number of rows equal to the number of potential item interaction weightings m and a number of columns equal to the selected number of latent factors k. In a number of embodiments, $B=U\Sigma V^T$, and $A \approx Q_Y^T U\Sigma V^T$. Recommendation server 310 (FIG. 3) can decompose thin matrix B using conventional singular value decomposition techniques.

As noted above, item interaction matrix A can be very large. In many embodiments, item interaction matrix A can have 70 million rows and 4 million columns. Performing singular value decomposition on such a large matrix is processing resource intensive, and can take too long. By performing singular value decomposition instead on thin matrix B, which in some embodiments can have 500 rows and 4 million columns, recommendation server 310 (FIG. 3) can perform singular value decomposition in much less time. For example, a singular value decomposition process that took 3 days using item interaction matrix A can take 3 hours using thin matrix B.

In various embodiments, block 406 of computing item feature matrix Q can include block 702 of computing a matrix product of matrix V and the matrix square root of matrix Σ. In a number of embodiments, item feature matrix Q can have a number of rows equal to the number of potential item interaction weightings m and a number of columns equal to the selected number of latent factors k. Recommendation server 310 (FIG. 3) can perform the matrix product operation using conventional matrix operation techniques. In a number of embodiments, block 406 of computing item feature matrix Q can be devoid of using matrix U, which can advantageously save processing resources and time.

Figure 8:
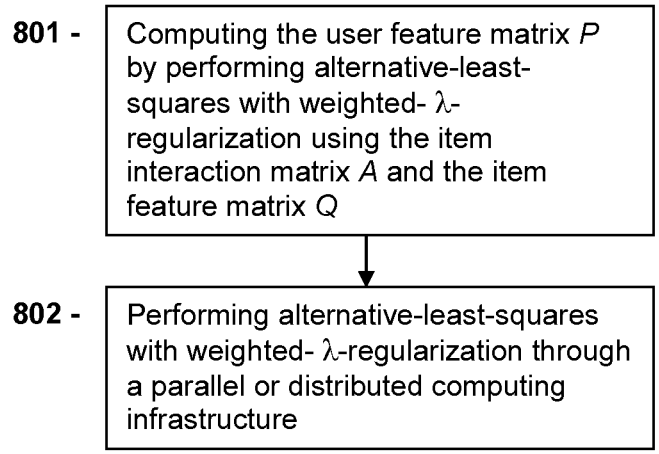
FIG. 8 illustrates a flow chart for an exemplary procedure of computing user feature matrix P, according to the embodiment of FIG. 4.

Turning ahead in the drawings, FIG. 8 illustrates a flow chart for block 407 of computing user feature matrix P, according to an embodiment. Block 407 is merely exemplary and is not limited to the embodiments presented herein. Block 407 can be employed in many different embodiments or examples not specifically depicted or described herein. In some embodiments, the procedures, the processes, and/or the activities of block 407 can be performed in the order presented. In other embodiments, the procedures, the processes, and/or the activities of block 407 can be performed in any suitable order. In still other embodiments, one or more of the procedures, the processes, and/or the activities of block 407 can be combined or skipped.

Referring to FIG. 8, in some embodiments, block 407 can include block 801 of computing user feature matrix P by performing alternative-least-squares with weighted-$\lambda$-regularization (ALS-WR) using item interaction matrix A and item feature matrix Q. In many embodiments, recommendation server 310 (FIG. 3) can perform ALS-WR, as described in a different context in Y. Zhou, D. Wilkinson, R. Schreiber, and R. Pan, *Large-scale Parallel Collaborative Filtering for the Netflix Prize*, AAIM, 337-348 (2008). In a number of embodiments, user feature matrix P can have a number of rows equal to the number of the plurality of users n. In some embodiments, user feature matrix P can have a number of columns equal to the selected number of latent factors k.

Next, in certain embodiments, block 407 also can include block 802 of performing ALS-WR though a parallel or distributed computing infrastructure. In some embodiments, recommendation server 310 (FIG. 3) can be a parallel or distributed computing system, such as a processing cluster, and can perform ALS-WR so as to take advantage of multiple concurrent processing, as described in Y. Zhou, supra, which can advantageously save processing resources and time.

Figure 9:
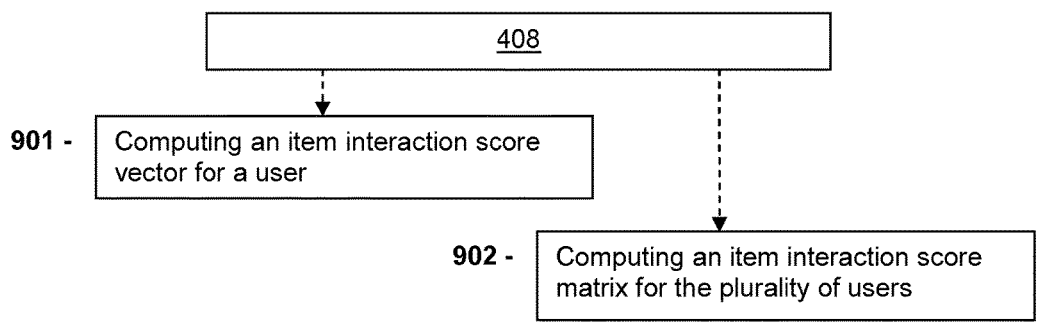
FIG. 9 illustrates a flow chart for an exemplary procedure of computing item interaction scores using user feature matrix P and item feature matrix Q, according to the embodiment of FIG. 4.

Turning ahead in the drawings, FIG. 9 illustrates a flow chart for block 408 of computing item interaction scores, according to an embodiment. Block 408 is merely exemplary and is not limited to the embodiments presented herein. Block 408 can be employed in many different embodiments or examples not specifically depicted or described herein. In some embodiments, the procedures, the processes, and/or the activities of block 408 can be performed in the order presented. In other embodiments, the procedures, the processes, and/or the activities of block 408 can be performed in any suitable order. In still other embodiments, one or more of the procedures, the processes, and/or the activities of block 408 can be combined or skipped.

Referring to FIG. 9, in some embodiments, block 408 can include block 901 of computing an item interaction score vector for a user of the plurality of users. In some embodiments, recommendation server 310 (FIG. 3) can use user feature matrix P and item feature matrix Q to compute a user's item interaction score vector, which can include item interaction scores for all or a subset of items and/or item interaction types. For example, in some embodiments, recommendation server 310 (FIG. 3) can compute item interaction scores for a particular user for all items that the user has not previously purchased. In other embodiments, recommendation server 310 (FIG. 3) can compute item interaction scores for each item interaction type, such as purchase interaction, browse interaction, etc.

In a number of embodiments, block 408 also can include block 902 of computing an item interaction scores matrix for the plurality of users. In certain embodiments, recommendation server 310 (FIG. 3) can use user feature matrix P and item feature matrix Q to compute item interaction scores for the plurality of users for all or a subset of items and/or item interaction types. For example, for all elements of item interaction matrix A for which the user has not performed a particular item interaction type, recommendation server 310 (FIG. 3) can compute item interaction scores.

Figure 10:
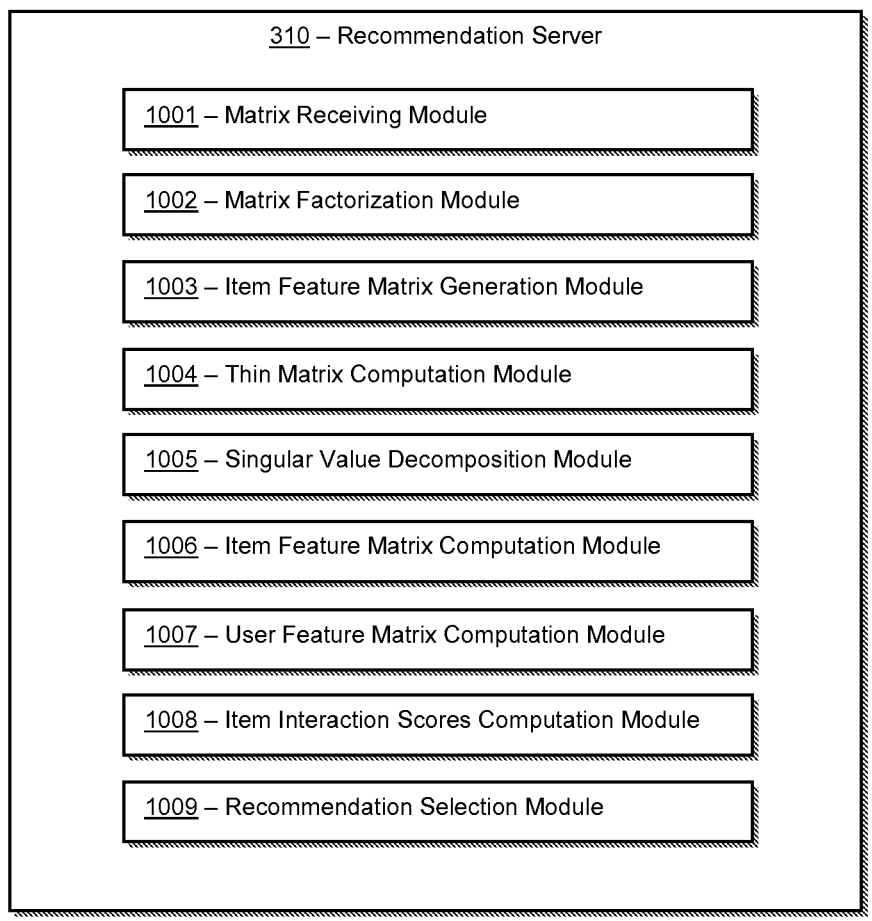
FIG. 10 illustrates a block diagram of an example of a recommendation server, according to the embodiment of FIG. 3.

Turning ahead in the drawings, FIG. 10 illustrates a block diagram of an example of recommendation server 310, according to the embodiment shown in FIG. 3. Recommendation server 310 is merely exemplary and is not limited to the embodiments presented herein. Recommendation server 310 can be employed in many different embodiments or examples not specifically depicted or described herein. In some embodiments, certain elements or modules of recommendation server 310 can perform various procedures, processes, and/or acts. In other embodiments, the procedures, processes, and/or acts can be performed by other suitable elements or modules. In a number of embodiments, the modules can be software. Embodiments of the modules can be implemented as software. Other embodiments can be implemented as specialized or dedicated hardware, or a combination of software and hardware.

Recommendation server 310 can include a matrix receiving module 1001. In some embodiments, matrix receiving module 1001 can perform block 401 (FIG. 4) of receiving an item interaction matrix A. In a number of embodiments, matrix receiving module 1001 can perform block 501 (FIG. 5) of receiving two or more item interaction type matrices and/or block 502 (FIG. 5) of generating item interaction matrix A by concatenating the two or more item interaction type matrices. In a number of embodiments, recommendation server 310 can include a matrix factorization module 1002. In certain embodiments, matrix factorization module 1002 can perform block 402 (FIG. 4) of factorizing the item interaction matrix A into user feature matrix P and item feature matrix Q. In various embodiments, recommendation server 310 can include an item feature matrix generation module 1003. In certain embodiments, item feature matrix generation module 1003 can perform block 403 (FIG. 4) of generating item feature matrix Q.

In some embodiments, recommendation server 310 can include a thin matrix computation module 1004. In certain embodiments, thin matrix computation module 1004 can perform block 404 (FIG. 4) of computing a thin matrix B. In many embodiments, thin matrix computation module 1004 can perform block 601 (FIG. 6) of generating a random Gaussian matrix G, block 602 of computing matrix Y, block 603 (FIG. 6) of decomposing matrix Y by QR factorization into matrix $Q_Y$ and matrix $R_Y$, and/or block 604 (FIG. 6) of calculating thin matrix B.

In a number of embodiments, recommendation sever 310 can include a singular value decomposition module 1005. In certain embodiments, singular value decomposition module 1005 can perform block 405 (FIG. 4) of performing a singular value decomposition on the thin matrix B. In a number of embodiments, singular value decomposition module 1005 can perform block 701 (FIG. 7) of decomposition the thin matrix B into a matrix U, a matrix $\Sigma$, and a matrix V. In many embodiments, recommendation server 310 can include an item feature matrix computation module 1006. In certain embodiments, item feature matrix computation module 1006 can perform block 406 (FIG. 4) of computing item feature matrix Q. In many embodiments, item feature matrix computation module 1006 can perform block 702 (FIG. 7) of computing a matrix product of the matrix V and a matrix square root of the matrix $\Sigma$.

In various embodiments, recommendation server 310 can include a user feature matrix computation module 1007. In certain embodiments, user feature matrix computation module 1007 can perform block 407 (FIG. 4) of computing the user feature matrix P. In many embodiments, user feature matrix computation module 1007 can perform block 801 (FIG. 8) computing user feature matrix P by performing ALS-WR using item interaction matrix A and item feature matrix Q. In certain embodiments, user feature matrix computation module 1007 can perform block 802 (FIG. 8) of performing ALS-WR though a parallel or distributed computing infrastructure.

In a number of embodiments, recommendation server 310 can include an item interaction scores computation module 1008. In certain embodiments, item interaction scores computation module 1008 can perform block 408 (FIG. 4) of computing item interaction scores using user feature matrix P and item feature matrix Q. In many embodiments, item interaction scores computation module 1008 can perform block 901 (FIG. 9) of computing an item interaction score vector for a user and/or block 902 (FIG. 9) of computing an item interaction score matrix for the plurality of users. In various embodiments, recommendation server 310 can include a recommendation selection module 1009. In certain embodiments, recommendation selection module 1009 can perform block 409 (FIG. 4) of selecting at least one item of the plurality of items for recommendation to at least one user.

Although the exemplary embodiments described above represent users as rows and item interactions as columns, such representations can be functionally equivalent to users being represented by columns and item interactions being represented by rows. When users are represented by columns and item interactions are represented by rows, the relevant operations described above, such as matrix operations, can be modified accordingly, as understood by those skilled in the art.

Although providing personalized item recommendations using scalable matrix factorization with randomness has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 4-9 may be include different procedures, processes, and/or activities and be performed by many different modules, in many different orders.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of providing personalized item recommendations via an Internet, a web server, and one or more ecommerce websites to at least one Internet user of a plurality of users based on item interactions by the plurality of users, the method being implemented via execution of computer instructions configured to run at one or more processors and configured to be stored at one or more non-transitory computer-readable media, the method comprising:

receiving an item interaction matrix A, wherein the item interaction matrix A has a plurality of rows corresponding to the plurality of users, a number of rows of the item interaction matrix A equals a number of the plurality of users, the item interaction matrix A has a plurality of columns corresponding to item interaction weightings for a plurality of items, and a number of columns of the item interaction matrix A equals a number of potential item interaction weightings; and factorizing the item interaction matrix A into a user feature matrix P and an item feature matrix Q, the factorizing comprising:

generating the item feature matrix Q, comprising:

computing a thin matrix B, wherein the thin matrix B is an estimated projection of the item interaction matrix A, a number of rows of the thin matrix B is equal to a selected number of latent factors, the number of rows of the thin matrix B is less than the number of the plurality of users; the number of rows of the thin matrix B is at least one of (a) not more than 1000 or (b) not more than 0.01% of the number of the plurality of users, and computing the thin matrix B comprises:

generating a random Gaussian matrix G, wherein the random Gaussian matrix G has a number of rows equal to the number of potential item interaction weightings, and the random Gaussian matrix G has a number of columns equal to the selected number of latent factors;

computing a matrix Y, wherein the matrix Y is a matrix product of the item interaction matrix A and the random Gaussian matrix G, and the matrix Y has a number of rows equal to the number of the plurality of users and a number of columns equal to the selected number of latent factors;

decomposing the matrix Y by a QR factorization into a matrix QY and a matrix RY, wherein the matrix Y is a matrix product of the matrix QY and the matrix RY, the matrix QY is an orthonormal matrix having a number of rows equal to the number of the plurality of users and a number of columns equal to the selected number of latent factors, and the matrix RY is a matrix having a number of rows and a number of columns each equal to the selected number of latent factors; and calculating the thin matrix B, wherein the thin matrix B is a matrix product of a transpose of the matrix QY and of the item interaction matrix A, and a number of columns of the thin matrix B is equal to the number of potential item interaction weightings;

performing a singular value decomposition on the thin matrix B; and computing the item feature matrix Q; and computing the user feature matrix P by performing alternative least squares using the item feature matrix Q;

computing item interaction scores using the user feature matrix P and the item feature matrix Q; and selecting at least one item of the plurality of items for recommendation to the at least one Internet user from the plurality of users based on the item interaction scores.

2. The method of claim 1, wherein receiving the item interaction matrix A comprises:

receiving two or more item interaction type matrices each having rows and columns, wherein the rows of each of the two or more item interaction type matrices correspond to the plurality of users, and the columns of each of the two or more item interaction type matrices correspond to item interaction weightings for a type of item interaction for the plurality of items; and generating the item interaction matrix A by concatenating the two or more item interaction type matrices.

3. The method of claim 2, wherein the two or more item interaction type matrices comprise at least one of: (a) an item purchase type matrix, (b) an item browse type matrix, (c) an item search type matrix, and (d) an item cart type matrix.

4. The method of claim 1, wherein each of the item interaction weightings are calculated based on an item interaction, a time decay adjustment, and an item popularity adjustment.

5. The method of claim 1, wherein the number of rows of the thin matrix B is not more than 1000.

6. The method of claim 1, wherein the number of rows of the thin matrix B is not more than 0.01% of the number of the plurality of users.

7. The method of claim 1, wherein the number of the plurality of users is greater than or equal to 500,000, and the number of potential item interaction weightings is greater than or equal to 100,000.

8. The method of claim 1, wherein computing the matrix Y is devoid of using a power iteration.

9. The method of claim 1, wherein:

performing the singular value decomposition on the thin matrix B comprises decomposing the thin matrix B into a matrix U, a matrix $\Sigma$, and a matrix V;

the thin matrix B is a matrix product of the matrix U, the matrix $\Sigma$, and a transpose of the matrix V;

the matrix U is an orthonormal matrix having a number of rows and a number of columns each equal to the selected number of latent factors;

the matrix $\Sigma$ is a diagonal matrix having a number of rows and a number of columns each equal to the selected number of latent factors;

the matrix V is an orthonormal matrix having a number of rows equal to the number of potential item interaction weightings and a number of columns equal to the selected number of latent factors;

computing the item feature matrix Q comprises computing a matrix product of the matrix V and a matrix square root of the matrix $\Sigma$;

the item feature matrix Q has a number of rows equal to the number of potential item interaction weightings; and the item feature matrix Q has a number of columns equal to the selected number of latent factors.

10. The method of claim 9, wherein computing the item feature matrix Q is devoid of using the matrix U.

11. The method of claim 1, wherein:

computing the user feature matrix P comprises computing the user feature matrix P by performing alternative-least-squares with weighted-$\lambda$-regularization (ALS-WR) using the item interaction matrix A and the item feature matrix Q;

the user feature matrix P has a number of rows equal to the number of the plurality of users; and the user feature matrix P has a number of columns equal to the selected number of latent factors.

12. The method of claim 11, wherein computing the user feature matrix P further comprises performing ALS-WR though a parallel or distributed computing infrastructure.

13. The method of claim 1, wherein:

performing the singular value decomposition on the thin matrix B comprises decomposing the thin matrix B into a matrix U, a matrix $\Sigma$, and a matrix V;

the thin matrix B is a matrix product of the matrix U, the matrix $\Sigma$, and a transpose of the matrix V;

the matrix U is an orthonormal matrix having a number of rows and a number of columns each equal to the selected number of latent factors;

the matrix $\Sigma$ is a diagonal matrix having a number of rows and a number of columns each equal to the selected number of latent factors;

the matrix V is an orthonormal matrix having a number of rows equal to the number of potential item interaction weightings and a number of columns equal to the selected number of latent factors;

computing the item feature matrix Q comprises computing a matrix product of the matrix V and a matrix square root of the matrix $\Sigma$;

the item feature matrix Q has a number of rows equal to the number of potential item interaction weightings; and the item feature matrix Q has a number of columns equal to the selected number of latent factors;

computing the item feature matrix Q is devoid of using the matrix U;

computing the user feature matrix P comprises computing the user feature matrix P by performing alternative-least-squares with weighted-$\lambda$-regularization (ALS-WR) through a parallel or distributed computing infrastructure using the item interaction matrix A and the item feature matrix Q;

the user feature matrix P has a number of rows equal to the number of the plurality of users; and the user feature matrix P has a number of columns equal to the selected number of latent factors.

14. The method of claim 1, wherein computing the item interaction scores comprises computing an item interaction score vector for a user of the plurality of users.

15. The method of claim 1, wherein computing the item interaction scores comprises computing an item interaction scores matrix for the plurality of users.

16. The method of claim 1, wherein:

receiving the item interaction matrix A comprises:

receiving two or more item interaction type matrices each having rows and columns wherein the rows of each of the two or more item interaction type matrices correspond to the plurality of users, the columns of each of the two or more item interaction type matrices correspond to item interaction weightings for a type of item interaction for the plurality of item, and the two or more item interaction type matrices comprise at least one of: (a) an item purchase type matrix, (b) an item browse type matrix, (c) an item search type matrix, and (d) an item cart type matrix; and generating the item interaction matrix A by concatenating the two or more item interaction type matrices; and computing the item interaction scores comprises computing an item interaction scores matrix for the plurality of users; wherein each of the item interaction weightings are calculated based on an item interaction, a time decay adjustment, and an item popularity adjustment, the number of rows of the thin matrix B is not more than 0.01% of the number of the plurality of users, the number of the plurality of users is greater than or equal to 500,000, and the number of potential item interaction weightings is greater than or equal to 100,000.

17. A system for providing personalized item recommendations to at least one Internet user of a plurality of users based on item interactions by the plurality of users, the system comprising:

one or more processors; and one or more non-transitory computer-readable media storing computing instructions configured to run on the one or more processors and perform:

receiving an item interaction matrix A, wherein the item interaction matrix A has a plurality of rows corresponding to the plurality of users, a number of rows of the item interaction matrix A equals a number of the plurality of users, the item interaction matrix A has a plurality of columns corresponding to item interaction weightings for a plurality of items, and a number of columns of the item interaction matrix A equals a number of potential item interaction weightings; and factorizing the item interaction matrix A into a user feature matrix P and an item feature matrix Q, the factorizing comprising:

generating the item feature matrix Q, comprising:

computing a thin matrix B, wherein the thin matrix B is an estimated projection of the item interaction matrix A, a number of rows of the thin matrix B is equal to a selected number of latent factors, the number of rows of the thin matrix B is less than the number of the plurality of users, and the number of rows of the thin matrix B is at least one of (a) not more than 1000 or (b) not more than 0.01% of the number of the plurality of users;

performing a singular value decomposition on the thin matrix B comprising decomposing the thin matrix B into a matrix U, a matrix Σ, and a matrix V, wherein the thin matrix B is a matrix product of the matrix U, the matrix Σ, and a transpose of the matrix V, the matrix U is an orthonormal matrix having a number of rows and a number of columns each equal to the selected number of latent factors, the matrix Σ is a diagonal matrix having a number of rows and a number of columns each equal to the selected number of latent factors, and the matrix V is an orthonormal matrix having a number of rows equal to the number of potential item interaction weightings and a number of columns equal to the selected number of latent factors; and computing the item feature matrix Q; and computing the user feature matrix P by performing alternative least squares using the item feature matrix Q;

computing item interaction scores using the user feature matrix P and the item feature matrix Q; and selecting at least one item of the plurality of items for recommendation to the at least one Internet user from the plurality of users based on the item interaction scores.

18. The system of claim 17, wherein:

computing the thin matrix B comprises:

generating a random Gaussian matrix G, wherein the random Gaussian matrix G has a number of rows equal to the number of potential item interaction weightings, and the random Gaussian matrix G has a number of columns equal to the selected number of latent factors;

computing a matrix Y, wherein the matrix Y is a matrix product of the item interaction matrix A and the random Gaussian matrix G, matrix Y has a number of rows equal to the number of the plurality of users and a number of columns equal to the selected number of latent factors, and computing the matrix Y is devoid of using a power iteration;

decomposing the matrix Y by a QR factorization into a matrix QY and a matrix RY wherein the matrix Y is a matrix product of the matrix QY and the matrix RY, the matrix QY is an orthonormal matrix having a number of rows equal to the number of the plurality of users and a number of columns equal to the selected number of latent factors, and the matrix RY is a matrix having a number of rows and a number of columns each equal to the selected number of latent factors; and calculating the thin matrix B wherein the thin matrix B is a matrix product of a transpose of the matrix QY and of the item interaction matrix A, and a number of columns of the thin matrix B is equal to the number of potential item interaction weightings;

computing the item feature matrix Q comprises computing a matrix product of the matrix V and a matrix square root of the matrix Σ wherein the item feature matrix Q has a number of rows equal to the number of potential item interaction weightings and a number of columns equal to the selected number of latent factors, and computing the item feature matrix Q is devoid of using the matrix U; and computing the user feature matrix P comprises computing the user feature matrix P by performing alternative-least-squares with weighted-λ-regularization (ALS-WR) through a parallel or distributed computing infrastructure using the item interaction matrix A and the item feature matrix Q wherein the user feature matrix P has a number of rows equal to the number of the plurality of users and a number of columns equal to the selected number of latent factors.

19. The system of claim 18, wherein:

receiving the item interaction matrix A comprises:

receiving two or more item interaction type matrices each having rows and columns wherein the rows of each of the two or more item interaction type matrices correspond to the plurality of users, the columns of each of the two or more item interaction type matrices correspond to item interaction weightings for a type of item interaction for the plurality of item, sand the two or more item interaction type matrices comprise at least one of: (a) an item purchase type matrix, (b) an item browse type matrix, (c) an item search type matrix, or (d) an item cart type matrix; and generating the item interaction matrix A by concatenating the two or more item interaction type matrices; and computing the item interaction scores comprises computing an item interaction scores matrix for the plurality of users, wherein:
    each of the item interaction weightings are calculated based on an item interaction, a time decay adjustment, and an item popularity adjustment;
    the number of rows of the thin matrix B is not more than 0.01% of the number of the plurality of users;
    the number of the plurality of users is greater than or equal to 500,000; and
    the number of potential item interaction weightings is greater than or equal to 100,000.

20. The system of claim 17, wherein the number of rows of the thin matrix B is not more than 1000.

\* \* \* \* \*